US012699237B2

(12) United States Patent
Rudnick et al.

(10) Patent No.: US 12,699,237 B2
(45) Date of Patent: Aug. 4, 2026

(54) METHODS FOR WELDING AN OPTICAL FIBER TO A PHOTONIC INTEGRATED CIRCUIT

(71) Applicant: Mellanox Technologies, Ltd., Yokneam (IL)

(72) Inventors: Roy Rudnick, Jerusalem (IL); Elad Mentovich, Tel Aviv (IL); Isabelle Cestier, Haifa (IL); Ran Hasson Ruso, Tel Aviv (IL); Dimitrios Kalavrouziotis, Papagou (GR); Anna Sandomirsky, Nesher (IL); Vladimir Iakovlev, Ecublens (CH)

(73) Assignee: Mellanox Technologies, Ltd., Yokneam (IL)

( * ) Notice: Subject to any disclaimer, the term of this patent is extended or adjusted under 35 U.S.C. 154(b) by 369 days.

(21) Appl. No.: 18/119,630

(22) Filed: Mar. 9, 2023

(65) Prior Publication Data

US 2024/0288639 A1     Aug. 29, 2024

(30) Foreign Application Priority Data

Feb. 28, 2023     (GR) ............................... 20230100170

(51) Int. Cl.
*G02B 6/42*                (2006.01)

(52) U.S. Cl.
CPC ......... *G02B 6/4237* (2013.01); *G02B 6/4214* (2013.01); *G02B 6/4243* (2013.01); *G02B 6/4244* (2013.01)

(58) Field of Classification Search
CPC ....................................................... G20B 6/42

USPC ........................................................... 385/52
See application file for complete search history.

(56) References Cited

U.S. PATENT DOCUMENTS

| | | | | |
|---|---|---|---|---|
| 4,967,745 A | * | 11/1990 | Hayes | A61B 18/245 606/7 |
| 2002/0037132 A1 | * | 3/2002 | Sercel | G02B 6/02052 385/50 |
| 2020/0124798 A1 | * | 4/2020 | Chen | G02B 6/4214 |
| 2021/0231863 A1 | * | 7/2021 | Ziegler | G01C 19/722 |
| 2022/0029375 A1 | * | 1/2022 | Endo | H01S 3/06725 |
| 2022/0404546 A1 | * | 12/2022 | Krichevsky | G02B 6/3652 |
| 2024/0264388 A1 | * | 8/2024 | Liang | G02B 6/4214 |

\* cited by examiner

*Primary Examiner* — Kaveh C Kianni

(74) *Attorney, Agent, or Firm* — ALSTON & BIRD LLP

(57)     ABSTRACT

Multiple methods are provided for fiber optic welding on a photonic integrated circuit (PIC). An example method includes providing a PIC, forming an attachment surface on the PIC configured to receive an optical fiber. The method further includes disposing at least a portion of the optical fiber on the attachment surface. The method may then include welding the optical fiber to secure the optical fiber with respect to the attachment surface. The attachment surface may be comprised of substantially the same material as an outer portion of the optical fiber and may result in a homogenous weld securing and connecting the optical fiber to the PIC.

20 Claims, 15 Drawing Sheets

PROVIDE A PIC
1402

DEFINE A GROOVE IN THE PIC
1404

DISPOSE A PASSIVATION LAYER OF SILICON DIOXIDE ON THE ATTACHMENT SURFACE
1406

DISPOSE AT LEAST A PORTION OF THE OPTICAL FIBER FOR RECEIPT BY THE ATTACHMENT SURFACE
1408

WELD THE OPTICAL FIBER TO SECURE THE OPTICAL FIBER WITH RESPECT TO THE ATTACHMENT SURFACE
1410

PROVIDE A PIC
1502

FORM AN ATTACHMENT SURFACE ON THE PIC CONFIGURED TO RECEIVE AN OPTICAL FIBER
1504

DISPOSE AT LEAST A PORTION OF THE OPTICAL FIBER ONTO THE ATTACHMENT SURFACE
1506

WELD THE OPTICAL FIBER TO SECURE THE OPTICAL FIBER WITH RESPECT TO THE ATTACHMENT SURFACE
1508

METHODS FOR WELDING AN OPTICAL FIBER TO A PHOTONIC INTEGRATED CIRCUIT

CROSS-REFERENCE TO RELATED APPLICATIONS

This application claims priority to Greek patent application Ser. No. 20230100170, filed Feb. 28, 2023, the entire contents of which application are hereby incorporated herein by reference.

TECHNOLOGICAL FIELD

Example embodiments of the present disclosure relate generally to optical fiber welding for photonic integrated circuits (PICs).

BACKGROUND

As the demand for data processing continues to increase, data transfer speeds have similarly needed to increase while keeping power consumption low. Chip-to-chip optical connections can reduce total power consumption by removing relay components. However, chip-to-chip connections may be used in conditions involving temperature stress and may create challenges for conventional material bonding techniques. Applicant has identified numerous deficiencies and problems associated with conventional fiber optic methods for creating chip-to-chip connections. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure are directed to methods of welding an optical fiber to a photonic integrated circuit (PIC). In some embodiments, an attachment surface configured to receive an optical fiber may be formed on a PIC. A portion of the optical fiber may be at least partially disposed on the attachment surface. Securement of the optical fiber with respect to the attachment surface may be accomplished through welding. The attachment surface may be comprised of substantially the same material as an outer portion of the optical fiber. Welding of the optical fiber may result in a homogenous weld for securing and connecting the optical fiber to the PIC.

In some embodiments, the attachment surface comprises a V-shaped groove defined by the PIC.

In some embodiments, optical beads may be disposed within the groove. The optical beads may be configured to facilitate welding of the optical fiber.

In some embodiments, the PIC defines a V-shaped groove. Forming the attachment surface may comprise disposing a silicon dioxide passivation layer on the V-shaped groove.

In some embodiments, the PIC defines a V-shaped groove and forming the attachment surface may be comprised of applying at least one mirror to a surface of the V-shaped groove. The at least one mirror may be configured to focus the welding of the optical fiber within the groove.

In some embodiments, the optical fiber may be cleaved to correspond to a shape of the attachment surface.

In some embodiments, a glass slab may be affixed to the optical fiber. The glass slab may be configured to extend to an area of the optical fiber for engagement with the attachment surface to facilitate welding.

In some embodiments, the PIC defines a groove having a curved cross-section. The attachment surface may be the surface of the groove.

In some embodiments, the attachment surface comprises a passivation layer comprising silicon dioxide.

In some embodiments, the method may comprise welding a silicon dioxide chip to an outer portion of the optical fiber. Welding the optical fiber onto the attachment surface may comprise welding the silicon dioxide chip to the passivation layer.

In some embodiments, the silicon dioxide chip may comprise a silicon nitride waveguide.

In some embodiments, the method may comprise affixing an extension to the optical fiber. Welding of the optical fiber may comprise welding the extension to the attachment surface.

In some embodiments, the affixed extension to the optical fiber may be a glass slab.

In some embodiments, the extension may be a prism.

In some embodiments, the prism may comprise a lens.

In some embodiments, the method may comprise disposing an intermediate material between the optical fiber and passivation layer.

In some embodiments, the intermediate material comprises a lens. The prism may be configured to direct an optical signal from the optical fiber into a waveguide of the PIC via the lens.

In some embodiments, the method may comprise affixing an optical glass substrate to the optical fiber. Welding the optical fiber may comprise welding the optical glass substrate to the attachment surface. The optical glass substrate may define an angled end configured to be welded to the attachment surface such that a predetermined working distance and angle for coupling is achieved.

A method for attaching an optical fiber to a photonic integrated circuit (PIC) may further comprise providing a PIC. A groove may further be defined in the PIC, and the groove may comprise an attachment surface configured to receive an optical fiber. The method may further include disposing a passivation layer of silicon dioxide on the attachment surface. At least a portion of the optical fiber may be disposed for receipt by the attachment surface. The method may further include welding the optical fiber to secure the optical fiber with respect to the attachment surface.

In some embodiments, the groove may be a V-shaped groove or have a curved cross section.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
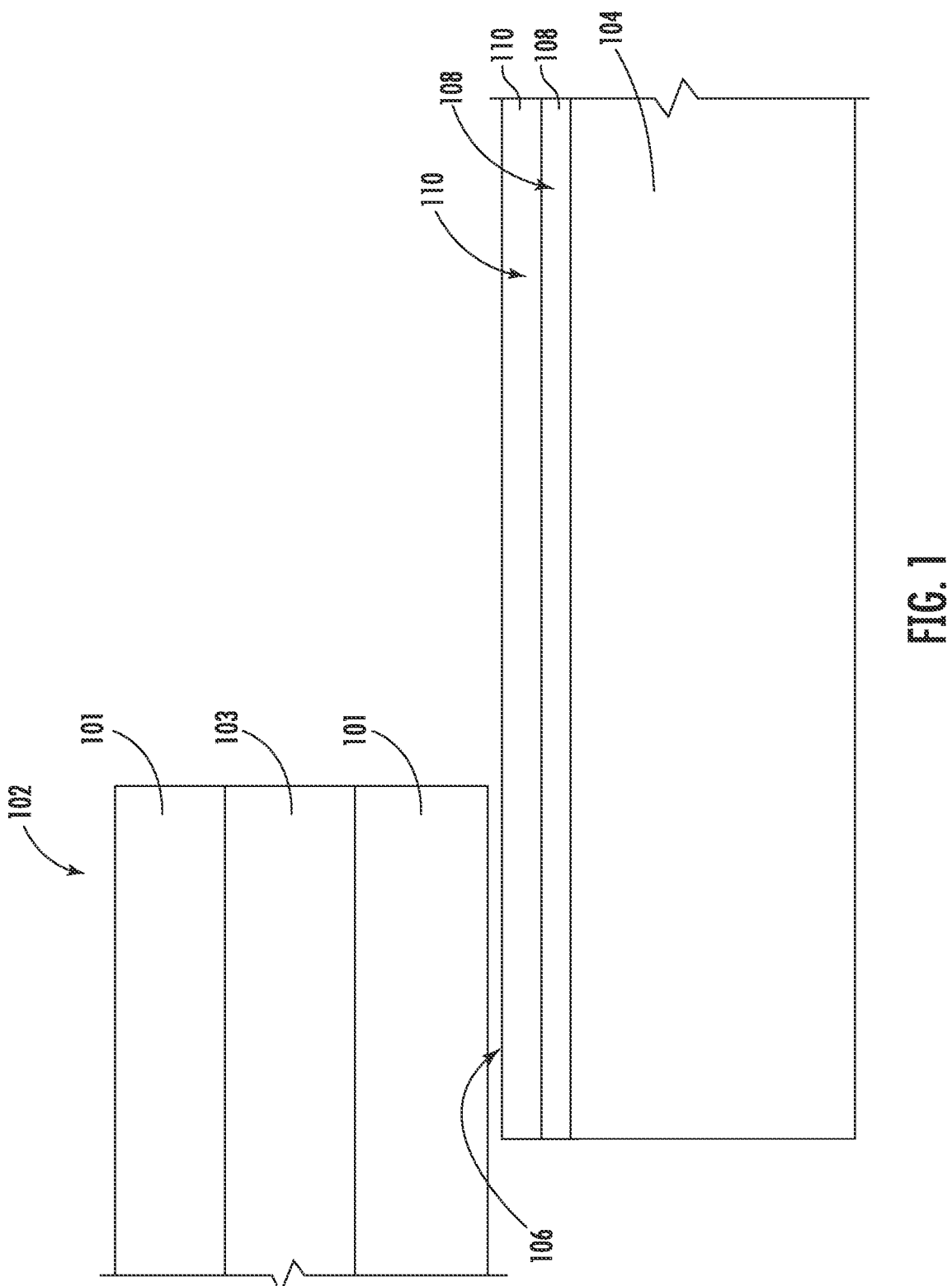
FIG. 1 is a schematic illustration of the attachment of an optical fiber to a photonic integrated circuit (PIC) in accordance with some embodiments described herein.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

An optical fiber is a flexible, transparent fiber made by drawing glass or plastic to a compressed diameter. Optical fiber may be used for telecommunications, long distance transmissions, power transmissions, light transmissions, sensor applications, and computer networking. An optical fiber may include a core surrounded by a cladding material with a lower index of refraction. In some cases, an optical fiber may include a cylindrical dielectric waveguide that transmits light along its axis through a process of total internal reflection. Materials used in the creation of optical fibers may include silica, fluorozirconate (fluoride glass), fluoroaluminate, chalcogenide glasses, crystalline materials and/or a combination of such materials.

A photonic integrated circuit (PIC) may refer to a microchip containing two or more photonic components that form a functioning circuit. In general, photonic components are components that are capable of detecting, generating, transporting, and/or processing light. PICs may include materials such as silicone, silicon nitride, silicon photonics, silica, lithium niobate, indium phosphide, and/or gallium arsenide. For example, a PIC may be made of a glass or silicon substrate and may include a waveguide made of silicon or silicon nitride and a passivation layer made of silicon dioxide.

Several conventional methods exist for connecting optical fibers with PICs for facilitating optical communication. Many of these rely on fibers mounted in ferrules or silicon V-groove chips using polymer adhesives, metal soldering, or laser welding. Welding involves the process of heating individual pieces or parts to the point of melting and subsequently fusing the pieces or parts together. Welding may be achieved through the use of a high-powered laser, blowtorch, electric arc, or other device used to generate heat for fusing the pieces together. Welding of the optic fiber may be conducted through welding single fibers or multiple element welding.

Conventional methods for forming connections between optical fibers and PICs are often prone to failure due to differences in thermal expansion coefficient between bonded surfaces, polymer degradation, uneven curing, or low melting temperature of the adhesive used. Additionally, silica-based optical fibers for chip-to-chip connections may be more at risk of failure due to use in harsh conditions and environments. Said conditions and environments may include varying temperatures or extreme operating conditions. Optical fibers may further experience temperature stress through temperature changes that may occur during or after installation. For example, the use of high-powered lasers to install or modify the optical fibers or system can cause significant temperature changes that can result in damage or failure. Bonding or welding materials that are mismatched or have incompatible material characteristics may further result in energy losses during operation, which can cause an increase in total power consumption.

In order to address these issues and others, embodiments of the present invention are directed to improved methods of welding an optical fiber to a PIC. In particular, embodiments of the methods described herein provide for components to be welded together such that the welded surfaces are homogeneous or have the same or similar material characteristics, thereby circumventing problems arising from a mismatch in material properties of the substrate, optic fiber, and/or the bonding material. As described in greater detail below, embodiments of the optic fiber welding methods described herein may thus be used to create strong, homogenous bonds with an increased tensile strength, which can reduce the incidence of failure and reduce the amount of power needed to overcome energy losses that may otherwise occur.

With reference to FIG. 1, an attachment of an optical fiber 102 to a photonic integrated circuit (PIC) 104 according to one embodiment is illustrated. As described above, the optical fiber 102 comprises a core 103 surrounded by cladding material 101. The cladding material 101 may be made of glass or a material with a lower index of refraction as compared to the core 103, as previously noted. As will be understood by one skilled in the art in light of this disclosure, the core 103 may serve as a waveguide, allowing light (e.g., an optical signal) to be propagated therethrough.

As noted above, the PIC 104 may comprise two or more photonic components, such as components capable of detecting, generating, transporting, and/or processing light. For example, in some cases, the PIC 104 may comprise a waveguide 108 that is configured to confine and convey an optical signal therethrough. In some cases, the PIC 104 may further comprise a passivation layer 110. The passivation layer 110 may form the outer layer of the PIC 104 and, as such, in some embodiments may overlie the waveguide 108, as shown in FIG. 1.

The passivation layer 110 may be a coating of a predetermined thickness that is configured to make the surface of the PIC 104 less reactive to chemical treatment. The passivation layer 110 may protect the surface of the PIC 104 from contamination, such as contamination that may otherwise occur during coating or surface treatment of the PIC. The prevention of contamination may further promote the strength of bonds created through welding (e.g., the bonds between the PIC 104 and the optical fiber 102), as contamination may reduce the otherwise homogenous nature of the materials being welded by introducing other materials to the juncture. The passivation layer 110 may, in some cases, be made of silicon dioxide or other materials with properties that protect the PIC 104 from foreign contaminants and resist chemical reaction, while also matching or being of a similar material to the material of the optical fiber 102 and/or the PIC that are being welded together.

In optical communications, an optical signal is often transmitted through an optical fiber and into a PIC, such as the optical fiber 102 and the PIC 104 shown in FIG. 1. As noted above, the optical fiber 102 and the PIC 104 must therefore be coupled in such a way as to allow optical signals to pass therebetween. One way to couple the optical fiber 102 and the PIC 104 is to weld these components together. Accordingly, to embodiments described herein, a homogeneous weld is created for securing the optical fiber 102 with respect to the PIC 104 by forming an attachment surface 106 on the PIC 104. The attachment surface 106 may be configured to receive the optical fiber 102. The homogenous weld may be formed by welding the optical fiber 102 (e.g., the cladding material 101 and/or the core waveguide 103) to the PIC 104 via the attachment surface 106, including any components included as part of the attachment surface, as described herein.

The attachment surface 106 may, for example, be a region, area, or zone that is formed on the PIC 104 that is configured to receive the optical fiber 102 and allows the PIC 104 and the optical fiber to be bonded together, such as via a welding operation, in such a way as to form a homogeneous weld.

The attachment surface 106 may have various configurations and may be formed in various ways. For example, in some embodiments, the attachment surface 106 may be formed directly in the material of the PIC 104. In other embodiments, such as the embodiment illustrated in FIG. 1, the attachment surface 106 may be formed in or otherwise comprise the passivation layer 110. In still other embodiments, described in greater detail below, the attachment surface 106 may comprise intermediate materials, such as additional components or structures, that are configured to perform a function with respect to the optical fiber 102 and/or the PIC 104 and are further configured to facilitate or enhance the homogenous weld.

The optical fiber 102 may be a single fiber or multiple fibers. In some embodiments, the outer portion of the optic fiber 102 (e.g., an outer surface of the optical fiber) may comprise a material that is the same or similar to the material(s) of the attachment surface 106, regardless of its configuration.

With continued reference to FIG. 1, at least a portion of the optical fiber 102 (e.g., an end of the optical fiber) may be disposed on the attachment surface 106. The optical fiber 102 may be welded to secure the optical fiber with respect to the attachment surface 106. Welding the optical fiber 102 may create a bond between the optical fiber 102 and the PIC 104. Because the attachment surface 106 comprises substantially the same material as an outer portion of the optical fiber, welding the optical fiber 102 results in a homogenous weld for securing and connecting the optical fiber 102 to the PIC 104. The PIC 104 may be configured to be reworkable after welding operations have been conducted on the PIC and optical fiber 102. For example, in the case of a failed attachment or faulty connection between a PIC 104 and components received by the PIC or an optical fiber 102, additional corrective welds may be performed to repair the failures.

Figure 2:
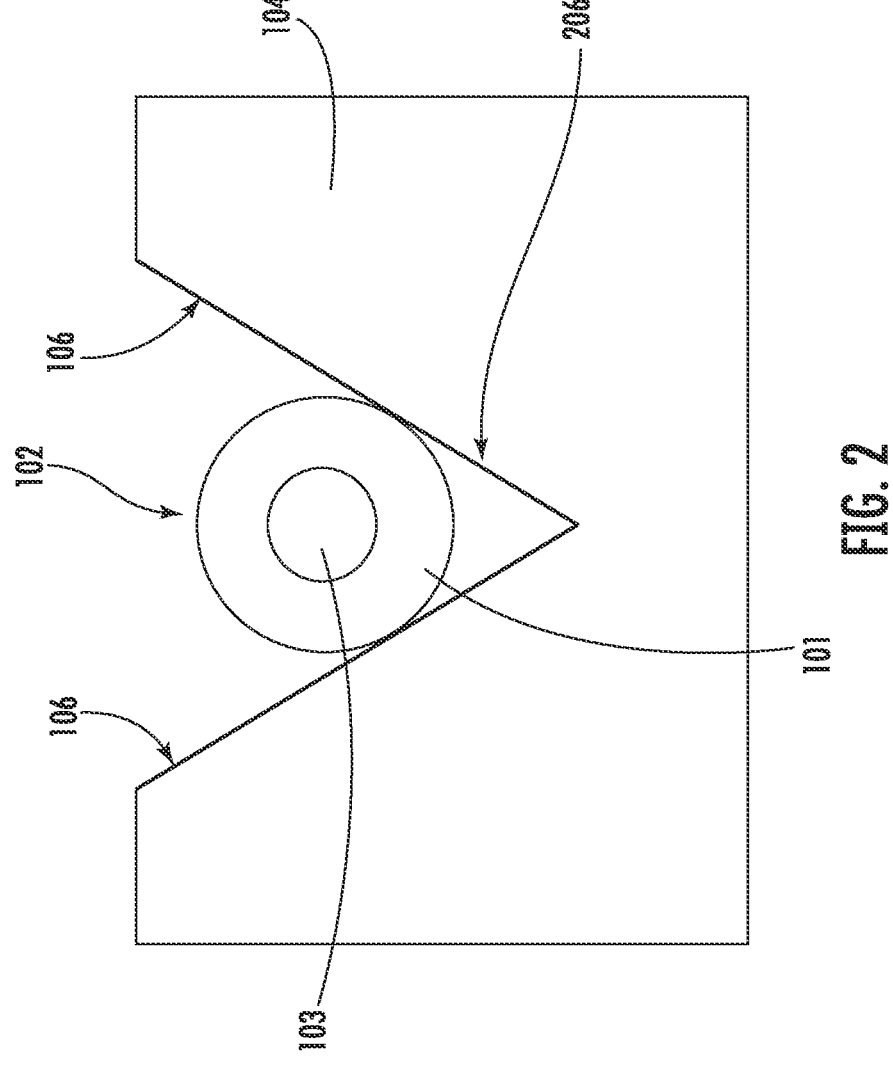
FIG. 2 illustrates a PIC having a V-shaped groove in accordance with some embodiments described herein.

With reference to FIG. 2, a transverse cross-section (e.g., a cross-section taken perpendicular to the longitudinal axis of an optical fiber 102) is shown. As depicted, in some embodiments, the PIC 104 may define a groove, such as a V-shape groove 206 as shown, and the attachment surface 106 may comprise the V-shaped groove defined by the PIC. The optical fiber 102 may be at least partially disposed in the V-shaped groove 206. The V-shaped groove 206 may be configured (e.g., sized and shaped) to have a depth and angle as determined by a user based on a number of factors, such as the dimensions of the optical fiber 102 and the dimensions of the PIC 104. The V-shaped groove 206 may, for example, be configured to optimize the contact area between the optical fiber 102 and the attachment surface 106 formed on the V-shaped groove 206. Furthermore, in cases where of multiple fibers or an array of optical fibers is to be received by and connected to the PIC 104, the PIC 104 may define multiple V-shaped grooves 206 and corresponding attachment surfaces 106 to connect the plurality of fibers.

Figure 3:
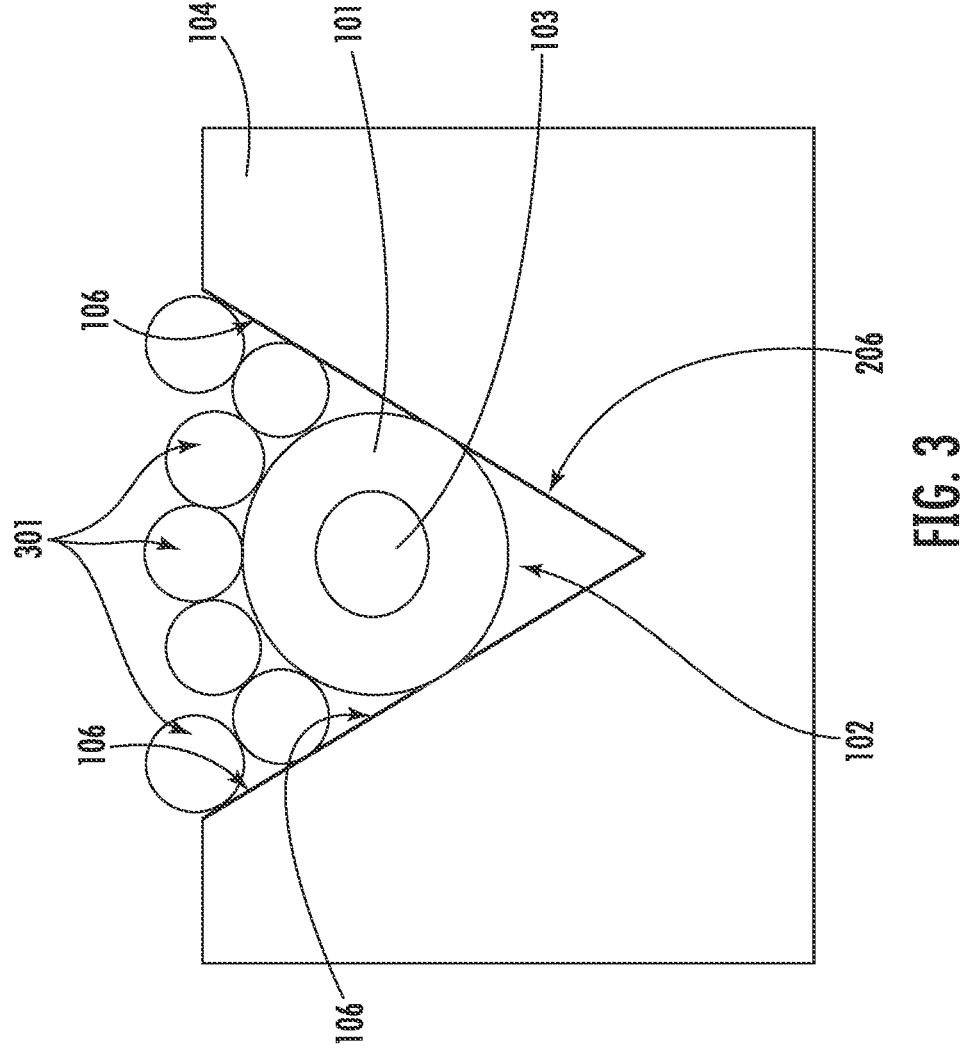
FIG. 3 illustrates optical beads disposed on an optic fiber disposed in a V-shaped groove in accordance with some embodiments described herein.

With reference to FIG. 3, optical beads 301 may be disposed in the V-shaped groove 206 in some embodiments to facilitate welding of the optical fiber 102 to the attachment surface 106. In such embodiments, the optical beads 301 may be placed in proximity to the optical fiber 102 and the attachment surface 106 of the V-shaped groove 206. The optical beads 301 may consist of the same or similar material as the optical fiber 102 and/or the PIC 104 and may be welded with the optical fiber 102 to create a homogenous weld for securing and connecting the optical fiber to the PIC. Said differently, the optical beads 301 may melt during the welding process and bond with both the optical fiber 102 and the PIC 104 to secure and connect them to each other via the attachment surface 106. In this way, the optical beads 301 may serve to increase the contact area between the optical fiber 102 and the attachment surface 106 by surrounding the optical fiber and more thoroughly connecting the optical fiber with the PIC 104. Placement of the optical beads 301 may be above the optical fiber 102 while the optical fiber is disposed in the V-shaped groove 206, below the optical fiber, or in both positions within the V-shaped groove 206. Welding of the optical fiber 102 within the V-shaped groove 206 with the additional material provided by the optical beads 301 may thus increase the strength and size of the bond formed with the PIC 104 while creating a homogeneous weld as described above. The dimensions and number of optical beads 301 used may be determined by the user based on a number of factors, such as the dimensions of the optical fiber 102 and the dimensions of the V-shaped groove 106.

Figure 4:
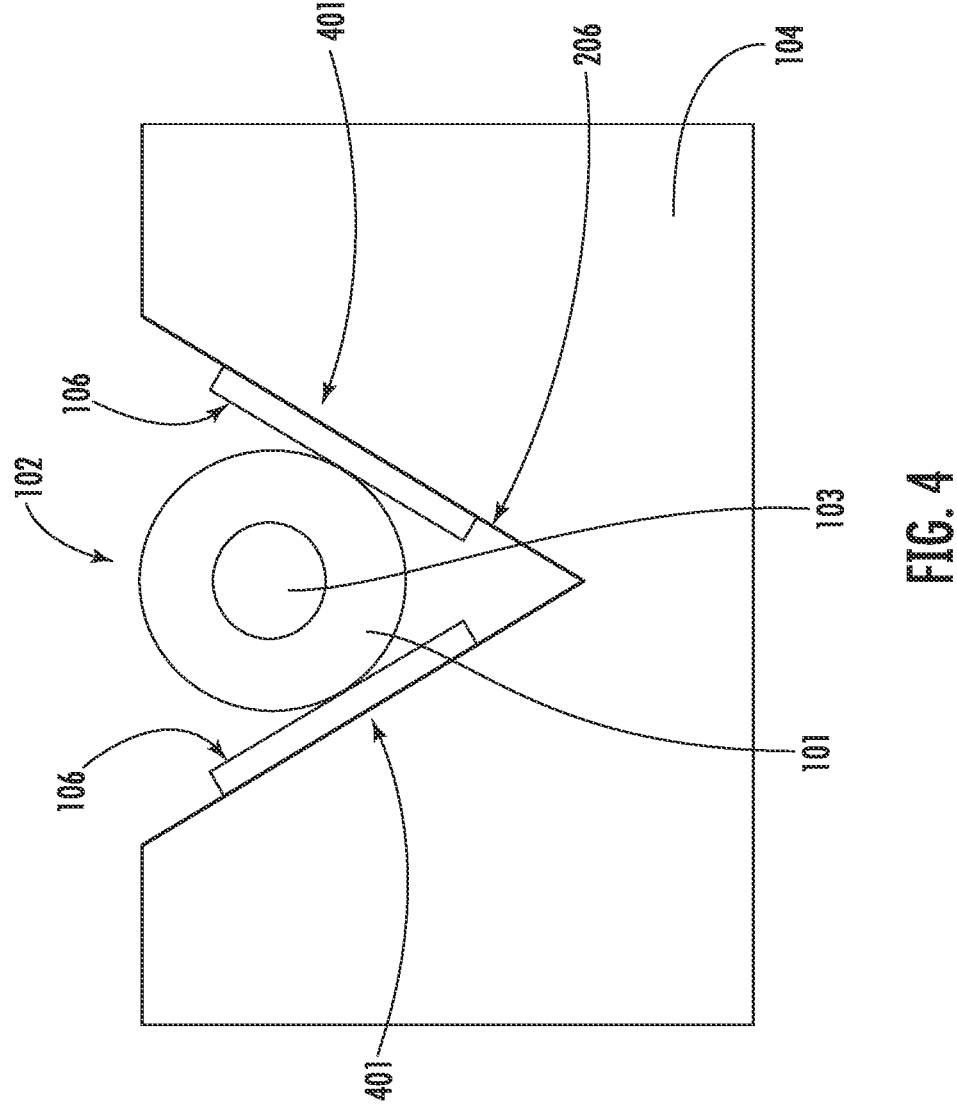
FIG. 4 illustrates passivation layers disposed within a V-shaped groove in accordance with some embodiments described herein.

With reference to FIG. 4 and as noted above, in some embodiments the PIC 104 defines a V-shaped groove 206, and the attachment surface 106 is formed by disposing a silicon dioxide passivation layer 401 onto the V-shaped groove. In such embodiments, the silicon dioxide passivation layer(s) 401 may be disposed on the walls of the V-shaped groove 206, as shown in FIG. 4, and may serve to make the surface of the PIC 104 (e.g., at the V-shaped groove 206) less reactive to chemical treatment and to protect it from contamination that may otherwise occur during coating processes or surface treatment, as described above. The silicon dioxide passivation layer(s) 401 may further prevent corrosion of the PIC 104 and may reduce the possibility that the material involved in the welding of the optical fiber 102 includes foreign contaminants. The thickness of the silicon dioxide passivation layer 401 may be determined based on a number of factors, including the material of the PIC 104 and the processes that the PIC and optical fiber 102 will undergo, among others. The silicon dioxide passivation layer 401 may be attached to the surface of the V-shaped groove 206 using an adhesive, and welding of the optical fiber 102 may bond the optical fiber to the passivation layer, creating a homogenous weld based on the material used for the passivation layer according to the embodiments described herein.

In some embodiments, a material similar to the cladding of the optical fiber 102 may be used in place of silicon dioxide to create a passivation layer. The passivation layer may be constructed using a material such as glass, silica, plastic, or other material with an index of refraction that is lower than that of the core and may perform similar functions as the silicon dioxide passivation layer 401.

Figure 5:
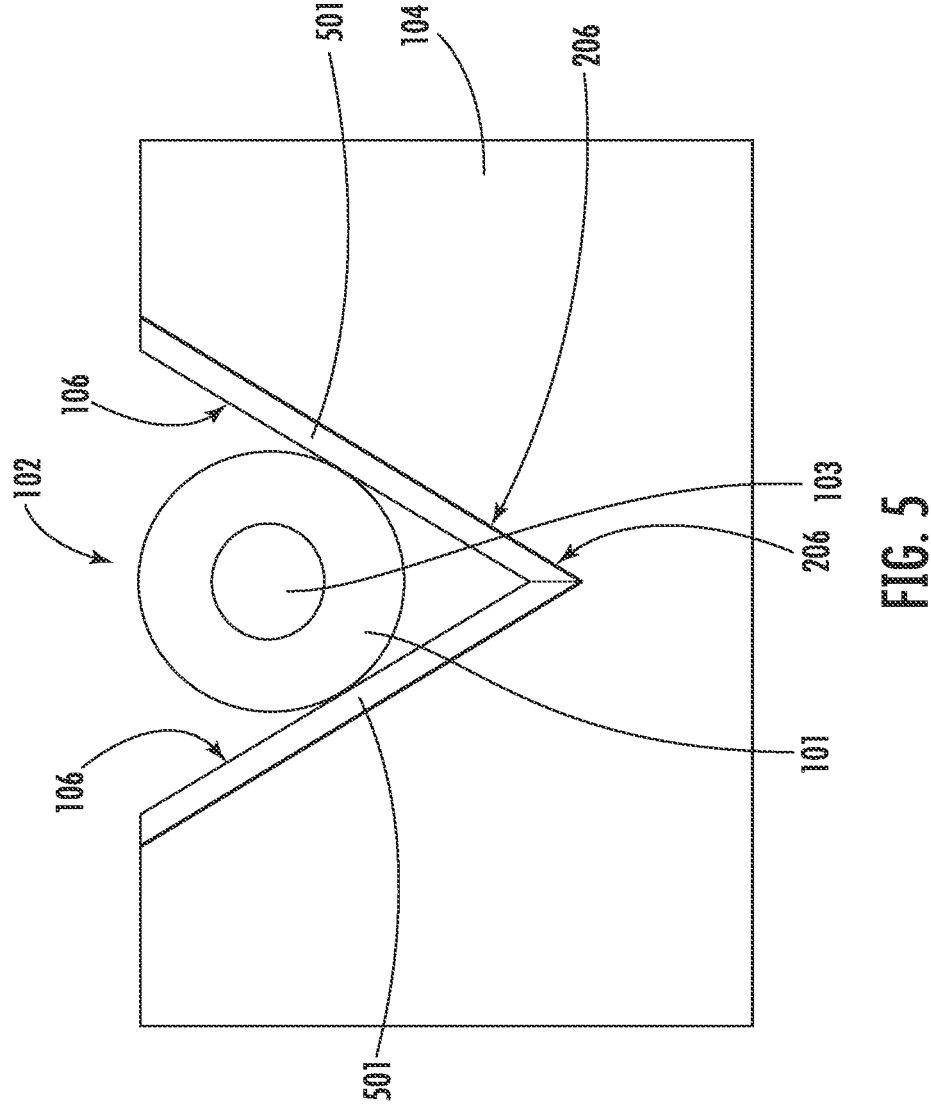
FIG. 5 illustrates at least one mirror disposed within a V-shaped groove in accordance with some embodiments described herein.

With reference to FIG. 5, in some embodiments in which the PIC 104 defines a V-shaped groove 206, the attachment surface 106 may be formed by applying at least one mirror 501 to a surface of the V-shaped groove. The at least one mirror 501 may be configured to focus laser welding of the optical fiber 102 within the groove. The at least one mirror 501 may, for example, be made of material that reflects and/or redirects the welding energy (e.g., the laser light used in laser welding) to concentrate the energy on the areas to be welded (e.g., the contact areas between the optical fiber 102 and the PIC 104). The at least one mirror 501 may, for example, be made of gold or aluminum in some cases. In some embodiments, a passivation layer 401 as shown in FIG. 4 may be disposed on top of the at least one mirror 501 (not shown). In such cases, the welding energy (e.g., the laser light) may pass through the passivation layer 401 to the at least one mirror 501 underneath to be focused by the at least one mirror. In some cases, as shown in FIG. 5, one or more mirrors 501 may be applied to each side of the V-shaped groove 206. Furthermore, mirrors may be placed above and/or below the optical fiber 102. Placement of the at least one mirror 501 below the optical fiber 102 may allow the mirror to function as a protective layer during the welding process, protecting potentially sensitive parts of the PIC 104.

Figure 8:
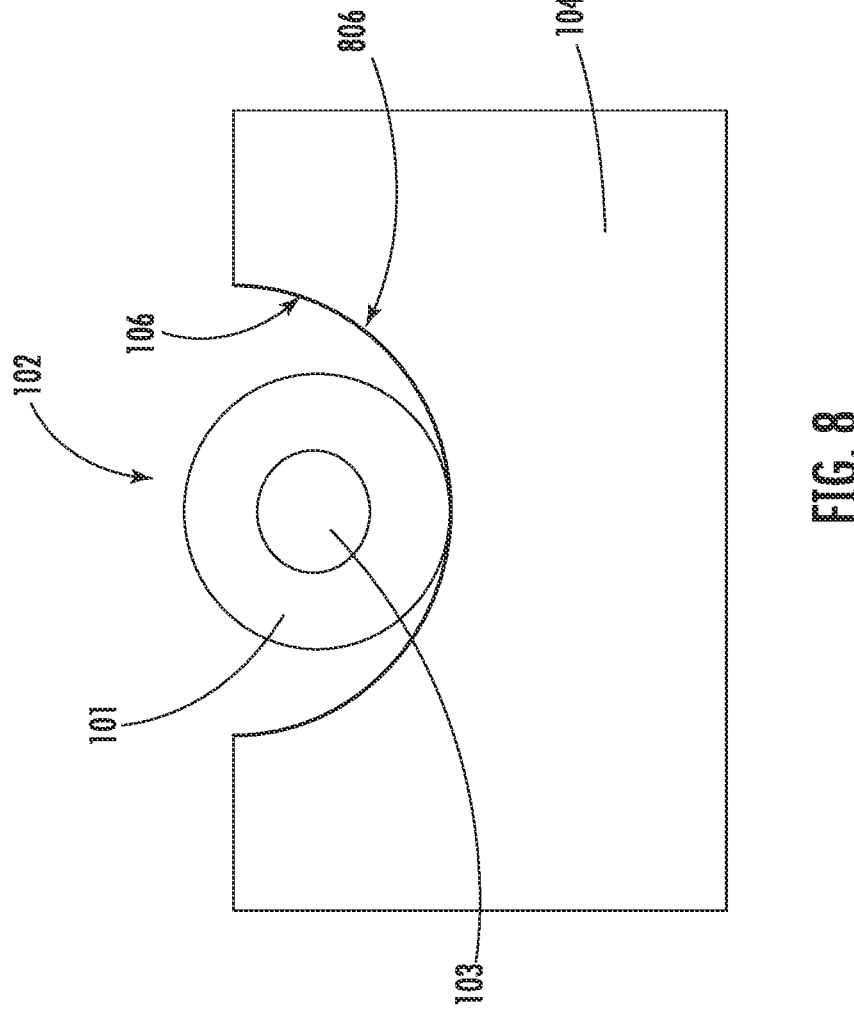
FIG. 8 illustrates an attachment surface of a PIC having a groove with a curved cross section in accordance with some embodiments described herein.

In some embodiments, the PIC 104 may define a groove 806 having a curved cross-section, as shown in FIG. 8, and the attachment surface 106 may be the surface of the groove. The curved groove 806 may have a radius of curvature equal to or greater than the radius of the optical fiber 102. In some cases, the curvature of the curved groove 806 may approach the curvature of the outer surface of the optical fiber 102, such that the contact area between the optical fiber and the groove (and, as such, the attachment surface 106) is maximized when the optical fiber is disposed in the groove. Due to the greater contact area between the optical fiber 102 and the PIC 104, welding tolerances may be increased, and the welding process may be optimized to create a stronger and more stable weld.

Figure 6:
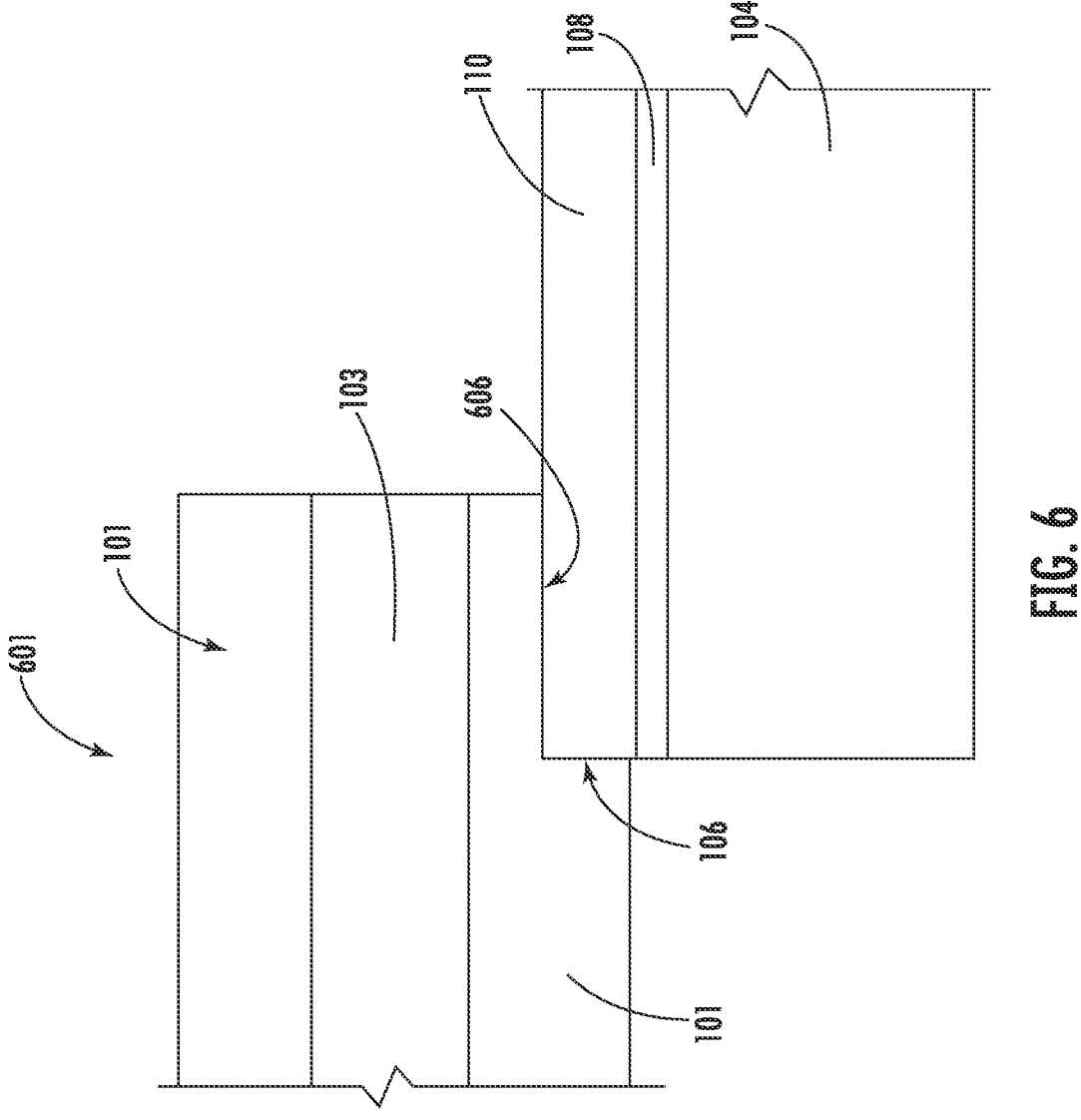
FIG. 6 is a schematic illustration of a cleaved optical fiber in accordance with some embodiments described herein.

In other embodiments, the attachment surface 106 formed on the PIC 104 may not be a groove defined in the PIC, but rather may be an outer surface of the PIC, as shown in FIG. 6. In such embodiments, the optical fiber 102 may be cleaved to correspond to a shape of the attachment surface 106. For example, the optical fiber 102 may be at least partially cleaved, cut, sheared, or otherwise have its physical shape modified to correspond to the shape of the attachment surface 106 of the PIC 104. In this way, the contact area between the optical fiber 102 and the attachment surface 106, and thereby the PIC 104, may be maximized. In FIG. 6, for example, the optical fiber 102 has a circular transverse cross-section, similar to that shown in FIGS. 2-5. The cross-section shown in FIG. 6 is taken along a longitudinal axis of the optical fiber. The PIC 104 in the depicted example may have a rectangular shape (e.g., rectangular prism). Thus, in the embodiment depicted in FIG. 6, the bottom portion of the optical fiber 102 (the portion to contact the attachment surface 106) may be cleaved using a longitudinal cut and a transverse cut to create a larger flat surface 606 with a right angle that is configured to correspond with the attachment surface 106 of the PIC 104 to create more thorough contact and engagement therebetween. In some embodiments (not shown), the cleaved surface 606 may engage a passivation layer 110 of the PIC 104. The passivation layer may be similar to the passivation layer 110 shown in FIG. 4 and described above.

Figure 7:
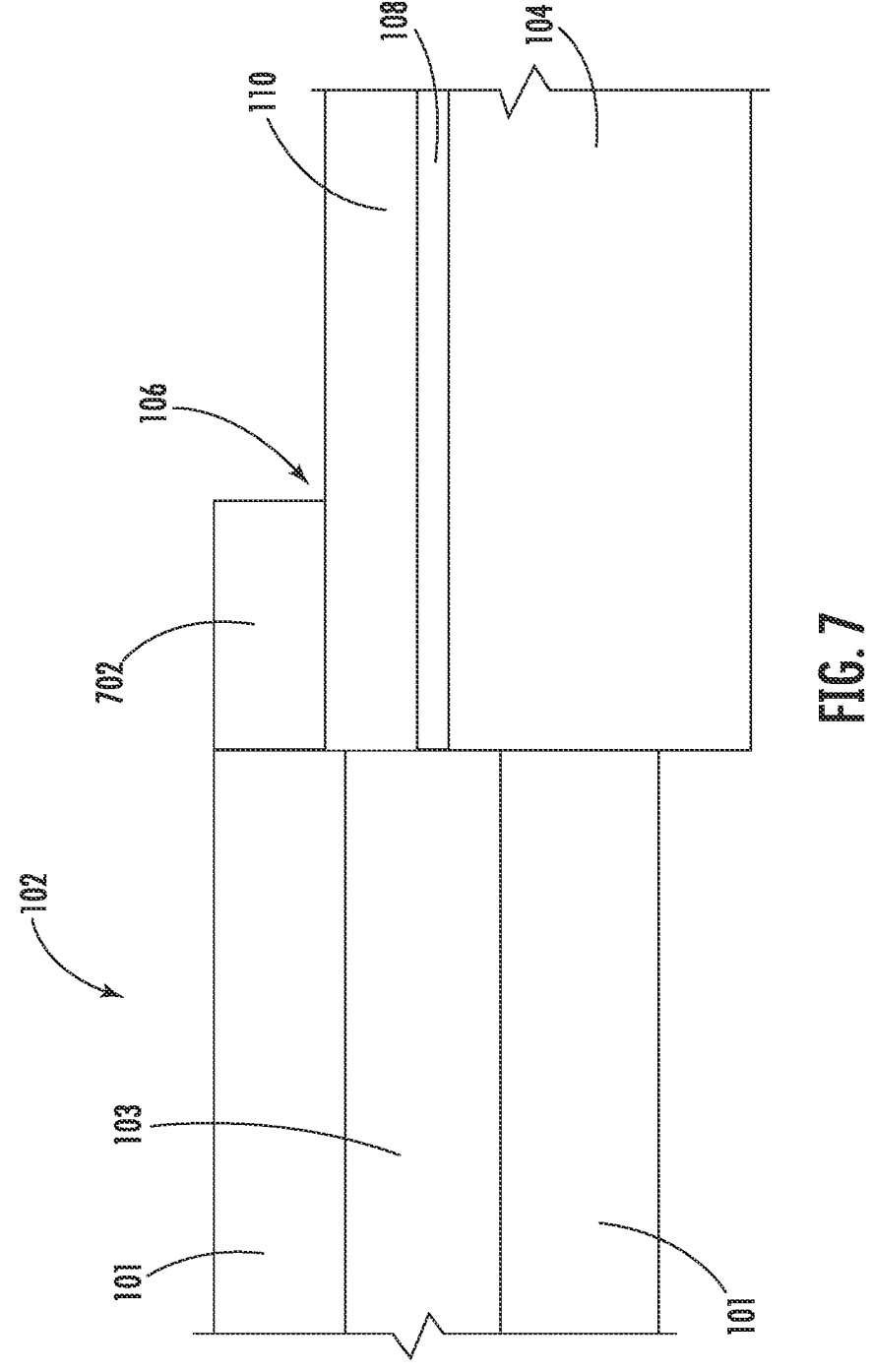
FIG. 7 is a schematic illustration of a glass slab affixed to an optical fiber in accordance with some embodiments described herein.

In some embodiments, as depicted in FIG. 7, rather than change the shape of the optical fiber 102 by cutting away a portion, such as with the cleaving process described above, in some embodiments a glass slab 702 may be affixed to the optical fiber. The glass slab 702 may be configured to extend an area of the optical fiber 102 for engagement with the attachment surface 106 to facilitate the welding. The glass slab 702 may be affixed to the optical fiber 102 to both add material that is similar to the optical fiber and/or the attachment surface 106, which may promote homogenous welding of the optic fiber to the PIC 104 and increase the contact area between the optical fiber and the attachment surface. Attachment of the glass slab 702 to the optical fiber 102 may be performed through a separate welding process and may further occur before attachment of the optical fiber to the PIC 104. The dimensions of the glass slab 702 may be configured based on the dimensions of the optical fiber 102 and the attachment surface 106, among other factors. As described above in connection with other embodiments, in some cases, the PIC 104 may include a passivation layer 110 and a waveguide 108.

Figure 9:
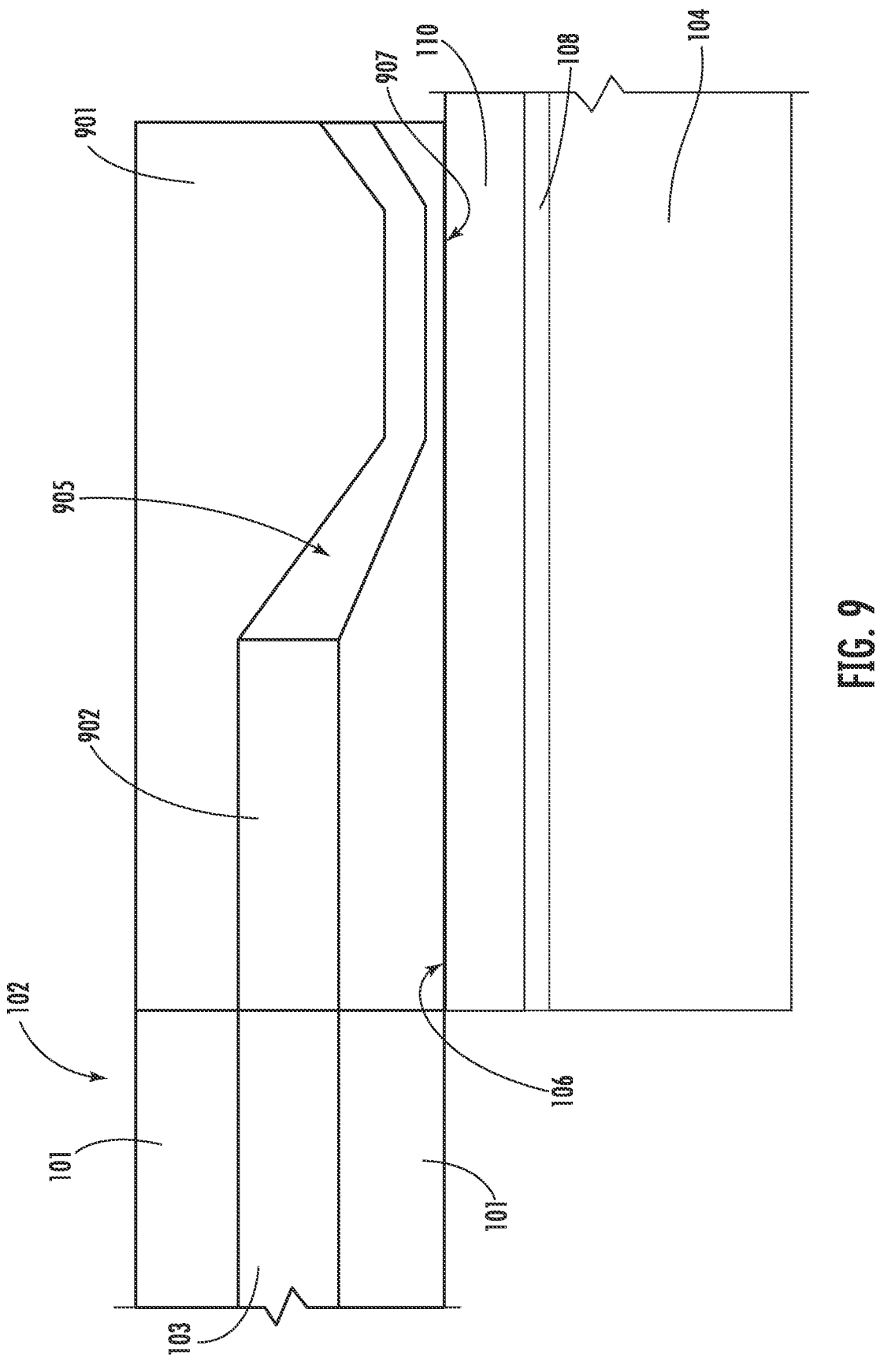
FIG. 9 is a schematic illustration of an optical fiber with a silicon dioxide chip and silicon nitride waveguide in accordance with some embodiments described herein.

In embodiments wherein the attachment surface 106 comprises a passivation layer 110 (e.g., a passivation layer comprising silicon dioxide), a silicon dioxide chip 901 may be welded to an outer portion of the optical fiber 102, as shown in FIG. 9. In such embodiments, welding the optical fiber 102 onto the attachment surface 106 may comprise welding the silicon dioxide chip 901 to the passivation layer 110. The silicon dioxide chip 901 may comprise a silicon nitride waveguide 902, which may act in similar manner as the waveguide 108 in the PIC 104. The silicon dioxide chip 901 and the silicon nitride waveguide 902 may be attached to the optical fiber 102 through a separate weld operation conducted before the optical fiber is welded to the PIC 104 via the attachment surface 106. The silicon dioxide chip 901 may, in some cases, be 3D-printed and configurable, such as by modifying the dimensions and/or modifying the silicon nitride waveguide 902 within the chip for a given PIC 104. The silicon nitride waveguide 902 may be shaped and/or oriented (e.g., positioned and angled) to direct optical signals toward the attachment surface 106, such as through the use of a sloped section 905 of the waveguide 902. The sloped section 905 of the silicon nitride waveguide 902 may be configured to direct optical signals from the optical fiber 102 toward the waveguide 108 in the PIC 104. The silicon nitride waveguide 902 may be configured to be placed within a predetermined distance (such as 1 micron) from the edge of the silicon dioxide chip 907 closest to the attachment surface 106. An optical signal traveling through the optical fiber 102 and within the silicon nitride waveguide 902 may thus be transmitted to the waveguide 108 of the PIC 104 due to the close proximity.

In continued reference to FIG. 9, the silicon dioxide chip 901 may be secured to the attachment surface 106 due to welding of the optical fiber 102, thereby securing the optical fiber to the PIC 104 with a homogenous weld. Said differently, due to the similar material characteristics of the silicon dioxide chip 901 and the attachment surface 106 (e.g., similar silicon content to the passivation layer 110 that creates a silicon-on-silicon weld), a homogenous weld can be formed. In some cases, the optical fiber 102 may be welded to the silicon dioxide chip 901 as described above. However, the silicon dioxide chip 901 may be secured to the PIC 104 through the application of an adhesive glue. An adhesive used to secure the silicon dioxide chip 901 to the PIC may enable the transmission of optical signals between the optical fiber 102 and the PIC 104 without interference.

Figure 10:
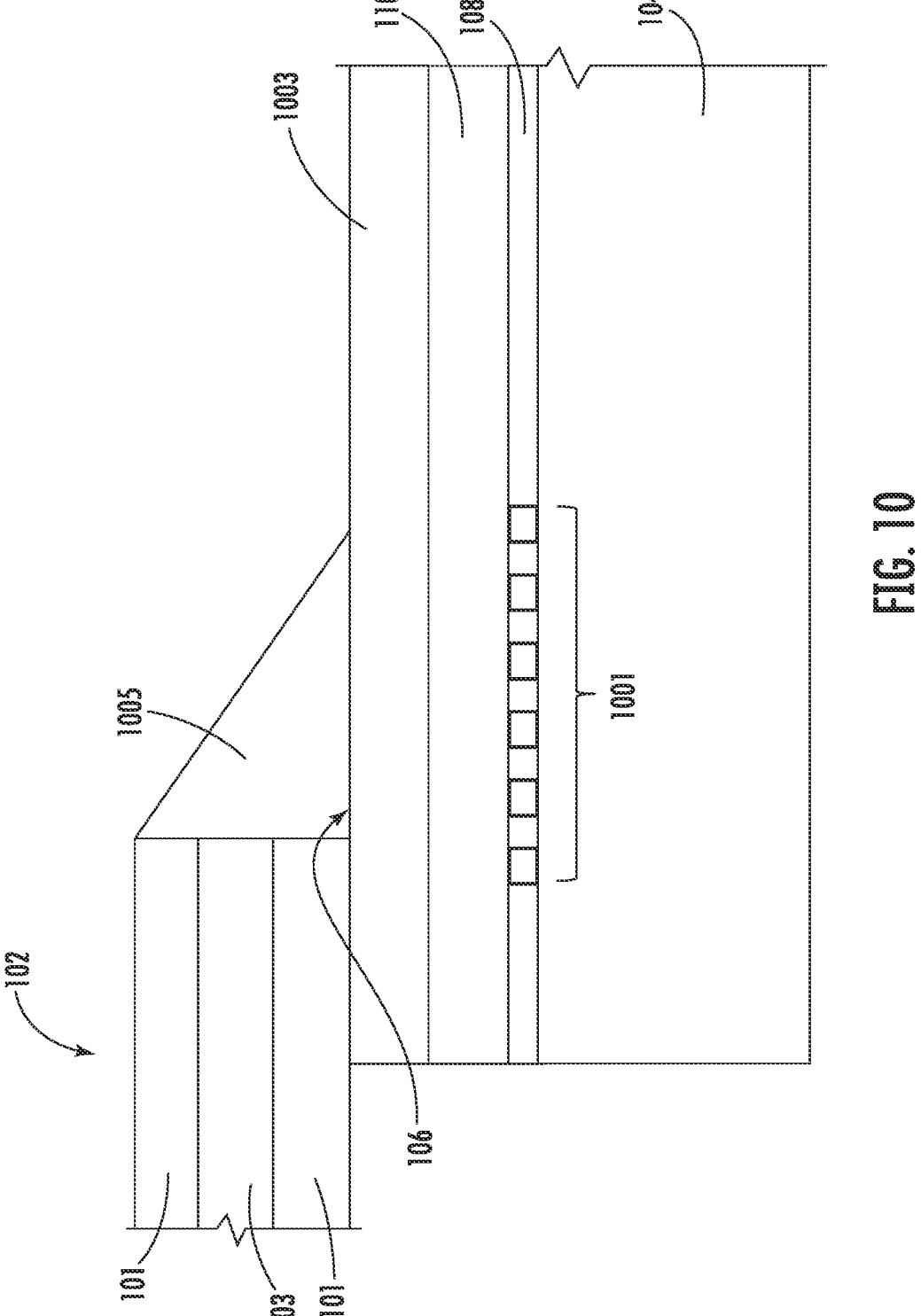
FIG. 10 is a schematic illustration of an optical fiber with a prism and grating coupler waveguide in accordance with some embodiments described herein.
Figure 11:
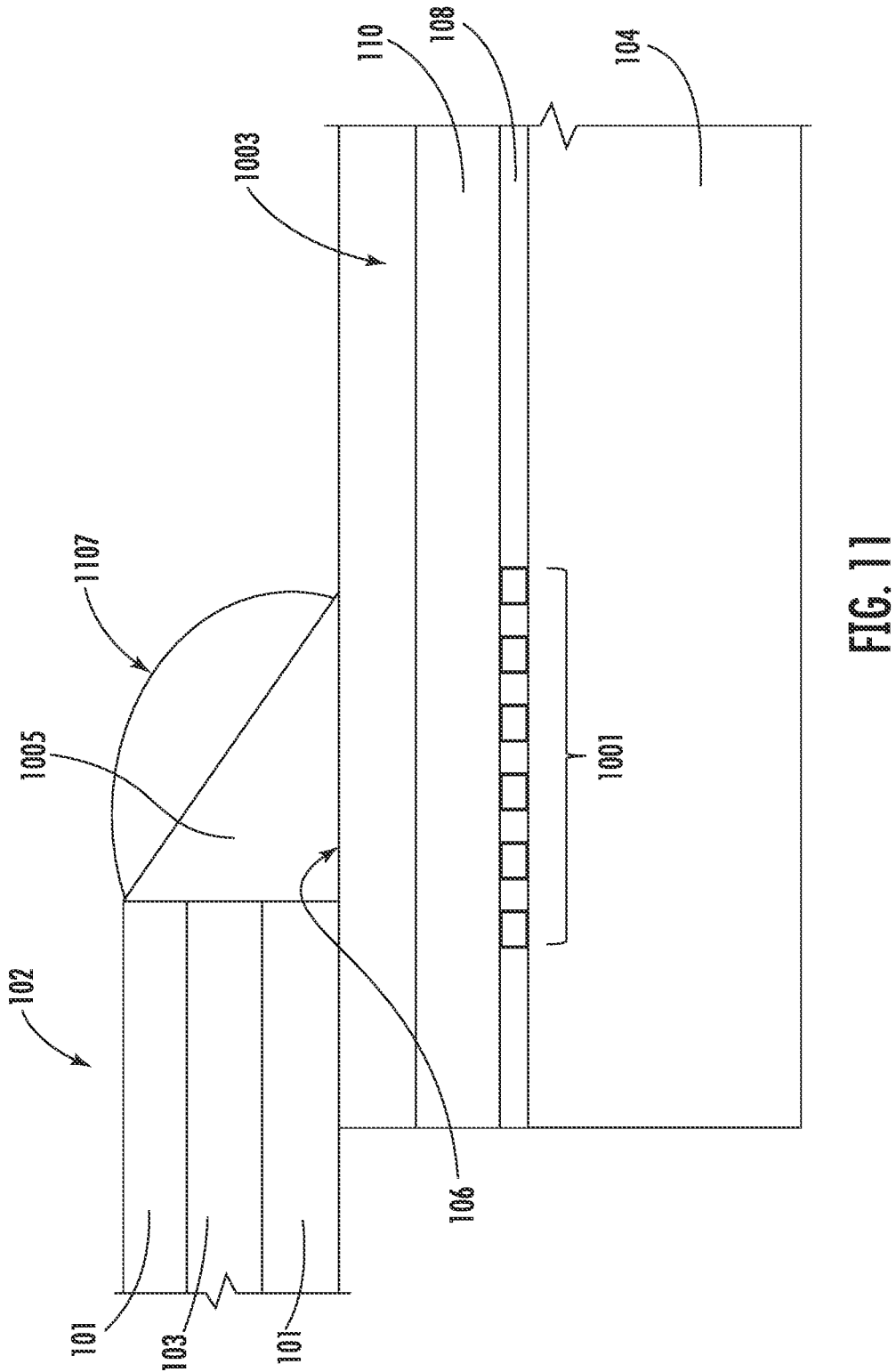
FIG. 11 is an illustration of an optical fiber with a prism, lens, and grating coupler waveguide in accordance with some embodiments described herein.
Figure 12:
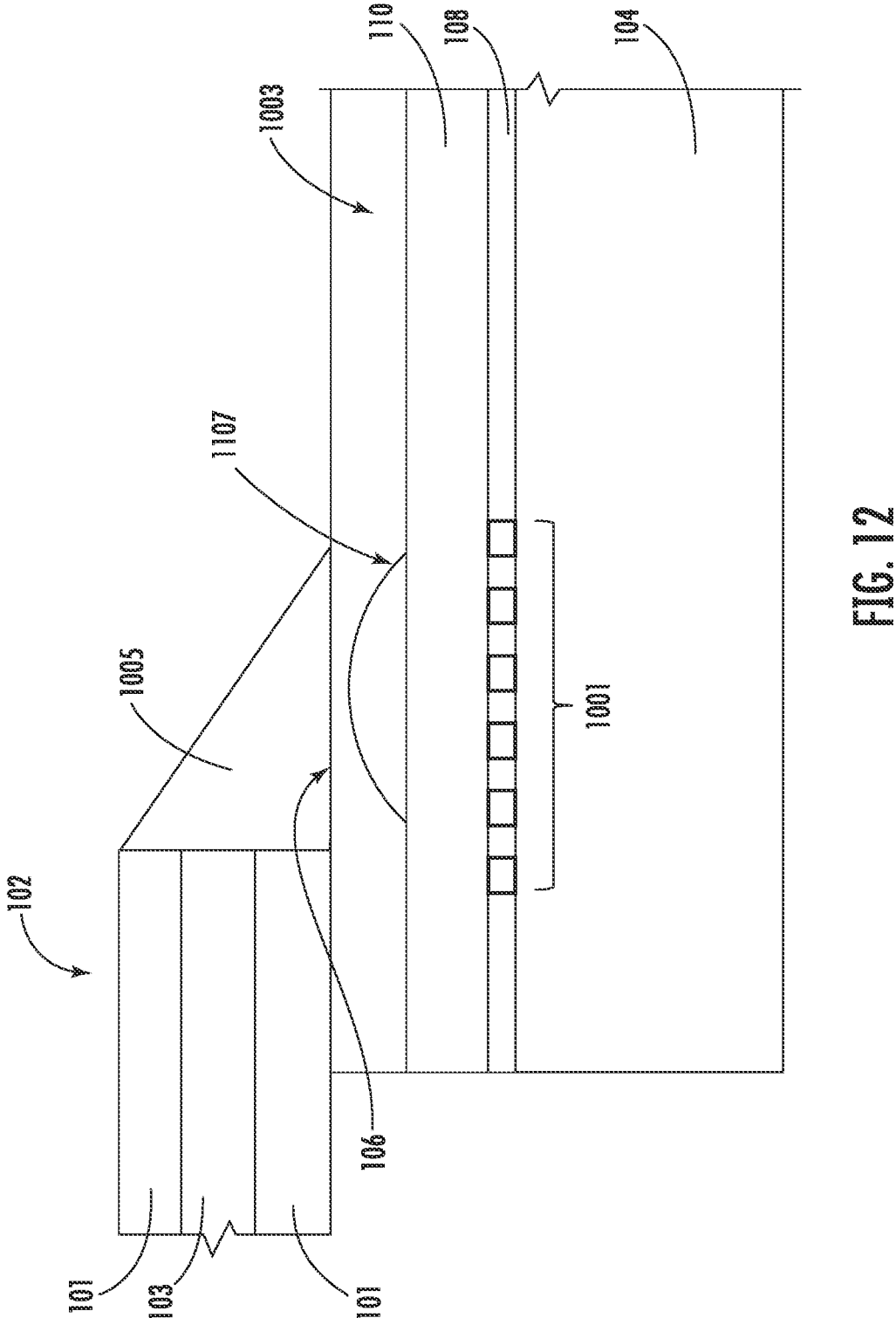
FIG. 12 is an illustration of an optical fiber with a prism having a grating coupler waveguide and lens embedded in an intermediate material in accordance with some embodiments described herein.

In still other embodiments wherein the attachment surface 106 comprises a passivation layer 110, an extension may be affixed to the optical fiber 102 and welding the optical fiber may comprise welding the extension to the attachment surface. For example, the extension may be affixed to the end of the optical fiber 102, and the extension may be a glass slab, such as the glass slab 107 shown in FIG. 7 and described above. In other embodiments, such as shown in FIGS. 10-12, the extension affixed to the optical fiber 102 may be a prism 1005. The prism 1005 may be made of a material similar to the optical fiber 102 or PIC 104, such as silicon dioxide, silica, glass, etc. The prism 1005 may be configured (e.g., sized and shaped) to correspond to the dimensions of the optical fiber 102. The prism 1005 may be attached to the optical fiber 102 through a welding process before the attachment of the optical fiber to the PIC 104. In other embodiments, the prism 1005 may further function as a waveguide and assist in directing optical signals from the optical fiber 102 toward the waveguide 108 within the PIC 104.

Additionally, in some embodiments, an intermediate material 1003 may be disposed between the optical fiber 102 and the passivation layer 110. The intermediate material

1003 may be made of materials similar to the optical fiber 102 and/or the PIC 104 to promote creation of a homogenous weld. The intermediate material 1003 may further serve to protect the PIC 104 during the welding process. The thickness of the intermediate material 1003 may be selected to maximize protection of the PIC 104 during the welding process. Additionally, in some embodiments, other components configured to transmit, propagate, process, or otherwise interact with the optical signal being carried by the optical fiber 102 and/or the PIC 104 may be incorporated. For example, according to the particular embodiments depicted in FIGS. 10-12, a grating coupler 1001 may be embedded within the waveguide 108 of the PIC 104. The grating coupler 1001 may be configured to have a predetermined length and period based on the desired coupling capabilities and may further be configured to allow certain optical signals to pass therethrough and into the waveguide 108 in the PIC 104. The intermediate material 1003 may be configured to set a working distance between the optical fiber 102 and the grating coupler 1001.

With reference to FIG. 12, in some embodiments the intermediate material 1003 may comprise a lens 1107. The prism 1005 may, in some cases, be configured to direct an optical signal from the optical fiber 102 into a waveguide 108 of the PIC 104 via the lens 1107. For example, the prism 1005 may be used to direct the optical signal traveling through the optical fiber 102 toward the grating coupler 1001.

In other embodiments, however, the lens 1107 may be separate from the intermediate material 1003. For example, the lens 1107 may, in some cases, be embedded within the prism 1005, such as when the prism 1005 comprises the lens. In still other embodiments, the lens 1107 may be affixed to a surface of the prism, such as depicted in FIG. 11.

Figure 13:
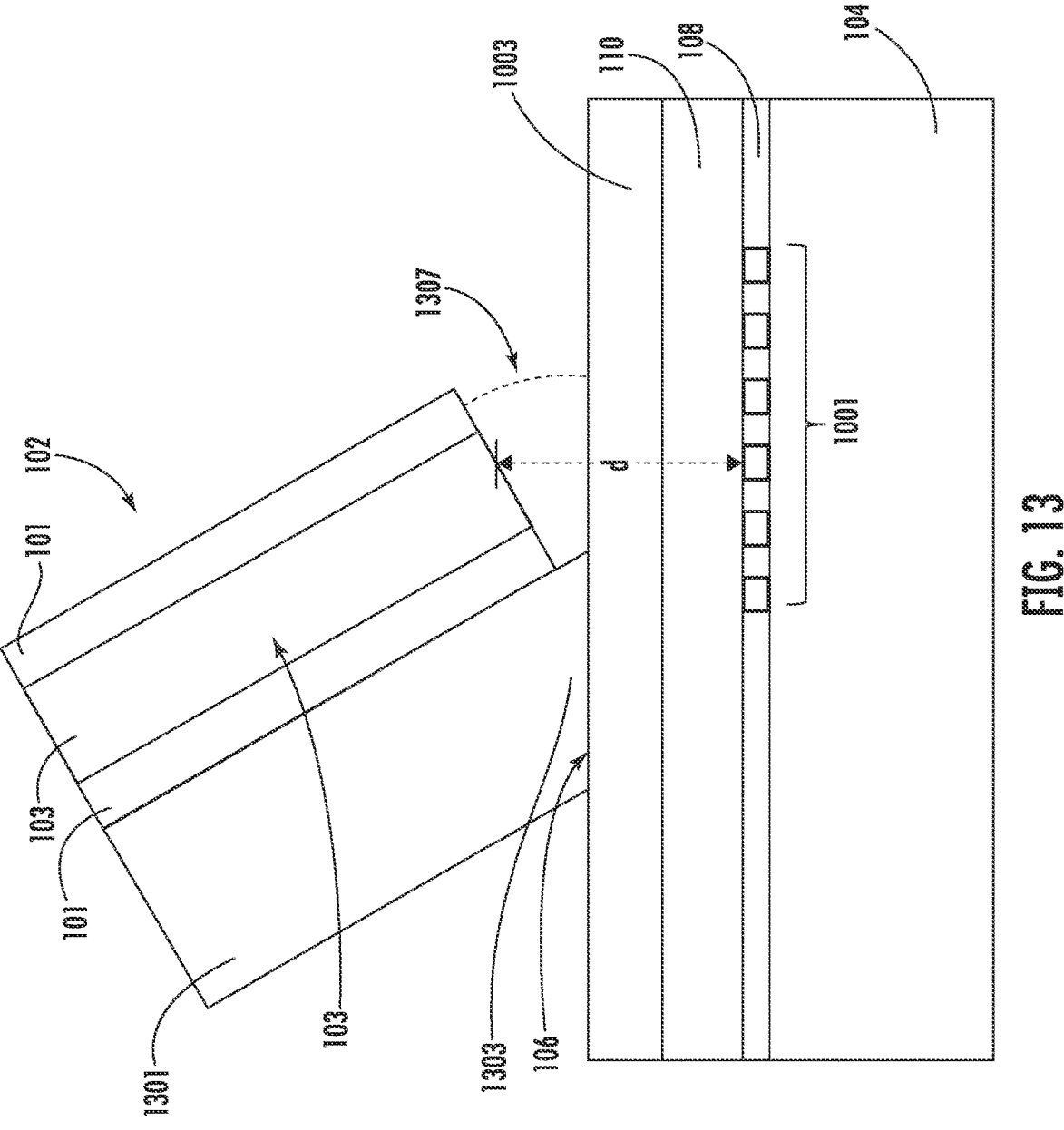
FIG. 13 is a schematic illustration of an optical glass substrate used to attach an optical fiber to a PIC in accordance with some embodiments described herein.

Turning now to FIG. 13, in some embodiments, an optical glass substrate 1301 may be affixed to the optical fiber 102. Welding the optical fiber 102 may, in such embodiments, comprise welding the optical glass substrate 1301 to the attachment surface 106. The optical glass substrate 1301 may define an angled end 1303 configured to be welded to the attachment surface 106 such that a predetermined working distance d and angle for coupling is achieved. The optical glass substrate 1301 may thus be configured (e.g., sized, shaped, angled, etc.) to adjust the distance d and substrate angle 1307 based on the dimensions of the PIC 104 and/or other components in the system. The optical glass substrate 1301 may, in some cases, be adhered or welded to an outer surface of the optical fiber 102 and may further be secured to the PIC 104 through welding with the intermediate material 1003 and/or the attachment surface 106. The optical glass substrate 1301 may further allow the optical signal to travel from the optical fiber 102, across the gap between the optical fiber and intermediate layer 1003 and toward the grating coupler 1001. The configuration of the optical glass substrate 1301 (e.g., the substrate angle 1307) sets the distance d between the optical fiber 102 and the grating coupler 1001.

Figure 14:
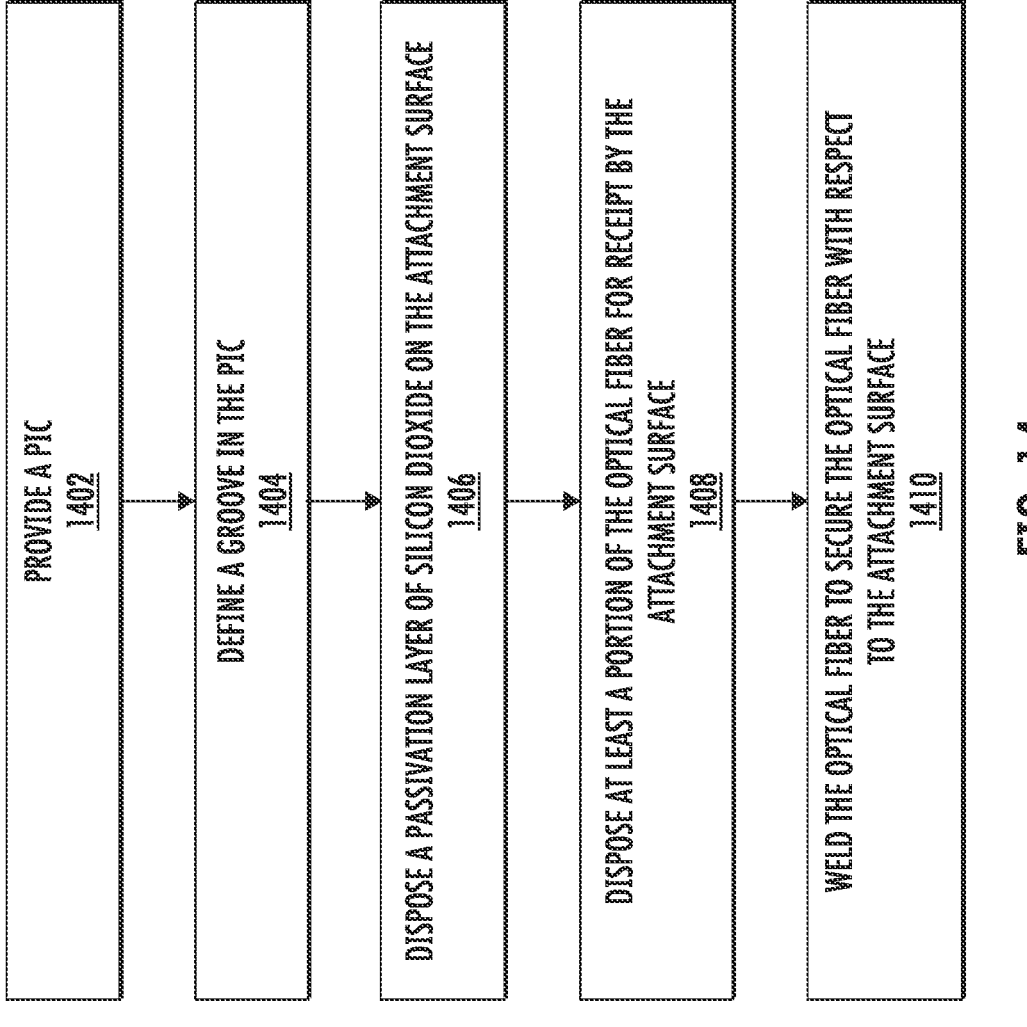
FIG. 14 is a flowchart illustrating a method for attaching an optical fiber to a PIC according to some embodiments described herein.

Referring to FIG. 14, a method of attaching an optical fiber 102 to a PIC 104 is shown that may comprise providing a PIC 104 (Block 1402) and defining a groove in the PIC (Block 1404). The PIC 104 may be modified to define a groove to facilitate welding of the optical fiber 102. The groove may take the form of a V-shaped groove, a curved-cross section groove, a U-shaped groove, or the like. The attachment surface 106 of the PIC 104 embodied in the form of a groove may add stability to the chip-to-chip connection, enable welding at lower temperatures (thus decreasing possible damage that may occur to the chip or PIC 104), and increasing the amount of welding position tolerance. Welding within the attachment surface 106 as embodied by a groove may further add two dimensions of stability to the bond created between the optical fiber and the PIC 104 in terms of pulling and bending strength. A passivation layer 110 of silicon dioxide may be disposed on the attachment surface 106 (Block 1406). The passivation layer 110 may refer to a thin layer of a similar material as the optical fiber 102 and the PIC 104 and may further be modified during the attachment process to form a homogenous weld used for securing and connecting the optical fiber to the PIC. At least a portion of the optical fiber 102 may then be disposed for receipt by the attachment surface 106 (Block 1408). The portion of the optical fiber 102 disposed for receipt may further include an extension of the optical fiber in the attachment surface 106. Said extension of the optical fiber 102 may include a glass slab, a silicon dioxide chip, a prism, a lens attachment, or the other embodiments described previously. The optical fiber 102 may then be welded to secure the optical fiber with respect to the attachment surface 106 (Block 1410). The welding of the optical fiber 102 to the attachment surface 106 may include elements previously described, such as a passivation layer, intermediate material, waveguide, or other such elements that may experience welding during the attachment process. The method may further include securing at least one mirror to the attachment surface. The at least one mirror may be configured to focus the welding of the optical fiber with the attachment surface, in a manner similarly described in FIG. 5.

Figure 15:
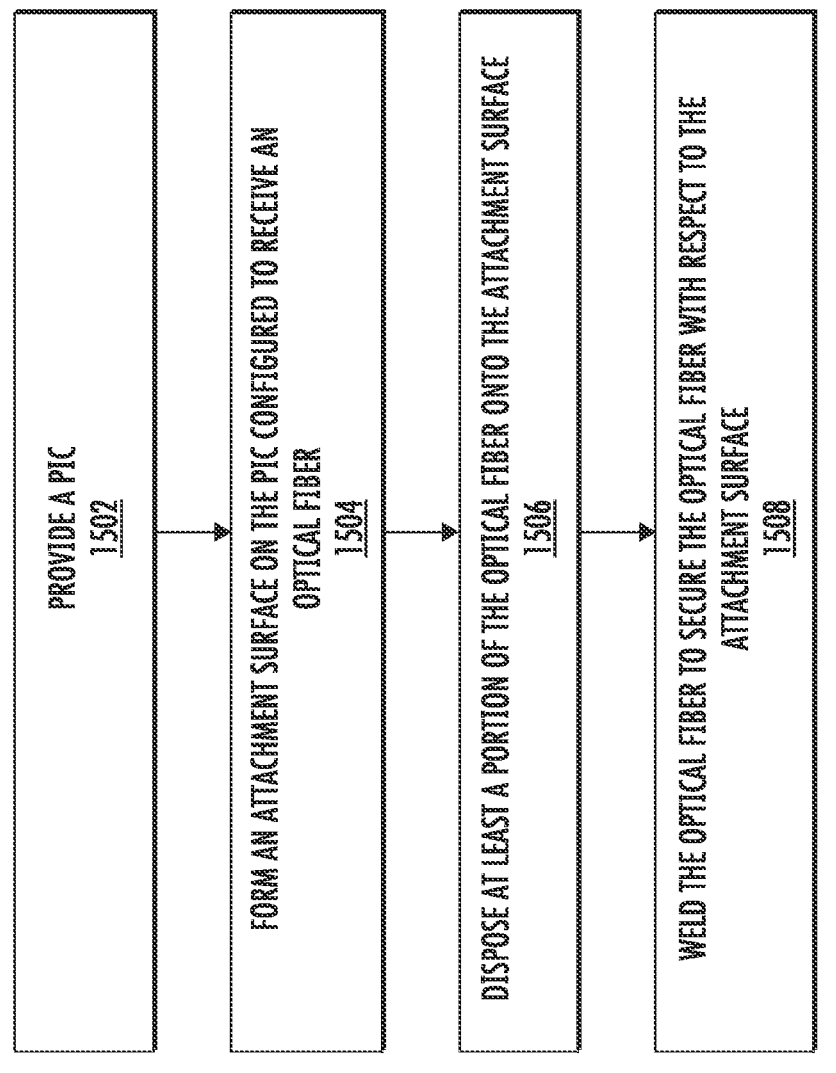
FIG. 15 is a flowchart illustrating another method for attaching an optical fiber to a PIC according to some embodiments described herein.

Referring now to FIG. 15, embodiments of another method of attaching an optical fiber 102 to a PIC 104 is shown that may comprise a PIC 104 may be provided (Block 1502). An attachment surface 106 may then be formed on the PIC 104 that may be configured to receive an optical fiber 102. At least a portion of the optical fiber 102 may be disposed onto the attachment surface 106 (Block 1506). The optical fiber 102 may then be welded with respect to the attachment surface 106 (Block 1508). The attachment surface 106 may be comprised of substantially the same material as an outer portion of the optical fiber 102, resulting in a homogenous weld for securing and connecting the optical fiber to the PIC 104.

As described above with respect to FIGS. 1-13, the optical fiber 102 may be welded to the PIC 104 in various ways using different methods to achieve the desired configuration and/or functionality. For example, in embodiments in which the attachment surface 106 comprises a V-shaped groove 206 defined by the PIC 104, optical beads 301 may be disposed within the groove. Additionally, or alternatively, forming the attachment surface may comprise disposing a silicon dioxide passivation layer onto the V-shaped groove. In some cases, at least one mirror 501 may be applied to at least one surface of the V-shaped groove. The at least one mirror 501 may be configured to focus the welding of the optical fiber 102 within the groove, as described above. In another embodiment, the optical fiber 102 may be cleaved to correspond to a shape of the attachment surface 106, as described above. In other embodiments, a glass slab 702 may be affixed to the optical fiber 102. The glass slab 702 may be configured to extend an area of the optical fiber 102 for engagement with the attachment surface 106 to facilitate welding. In some embodiments, the attachment surface may comprise a passivation layer 110 comprising silicon dioxide, and a silicon dioxide chip 901 may be welded to an outer portion of the optical fiber 102. Welding the optical fiber 102 onto the attachment surface 106 may comprise welding the silicon dioxide chip 901 to the passivation layer 110. The silicon dioxide chip 901 may, in some embodiments comprise a silicon nitride waveguide 902.

In other embodiments including the passivation layer 110, an extension may be affixed to the optical fiber 102 and welding the optical fiber may comprise welding the extension to the attachment surface 106. Affixing the extension to the optical fiber 102 may comprise affixing the extension to an end of the optical fiber, and the extension may be a glass slab 702, as described above. The extension may, in some cases, include a prism 1005, a lens 1107, or a combination of both. In other embodiments, an optical glass substrate 1301 may be affixed to the optical fiber 102. Welding the optical fiber 102 may comprise welding the optical glass substrate 1301 to the attachment surface, and the optical glass substrate may define an angled end 1303 configured to be welded to the attachment surface such that a predetermined working distance d and angle for coupling 1307 is achieved.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of any optical component or optoelectronic element. In addition, the methods described above may include fewer steps in some cases, while in other cases may include additional steps. Modifications to the steps of the method described above, in some cases, may be performed in any order and in any combination.

Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

That which is claimed:

1. A method for attaching an optical fiber to a photonic integrated circuit (PIC), the method comprising:
    providing the PIC;
    forming an attachment surface on the PIC configured to receive the optical fiber, wherein the attachment surface of the PIC comprises substantially the same material as an outer portion of the optical fiber;
    disposing at least a portion of the outer portion of the optical fiber onto the attachment surface; and
    heating an outer surface of the portion of the outer portion of the optical fiber and the attachment surface of the PIC to a melting point of the material to form a homogenous weld securing the optical fiber with respect to the attachment surface of the PIC.

2. A method according to claim 1, wherein the attachment surface comprises a V-shaped groove defined by the PIC.

3. A method according to claim 2 further comprising disposing optical beads within the V-shaped groove, wherein the optical beads are configured to facilitate formation of the homogenous weld.

4. A method according to claim 1, wherein the PIC defines a V-shaped groove, wherein forming the attachment surface comprises disposing a silicon dioxide passivation layer onto the V-shaped groove.

5. A method according to claim 1, wherein the PIC defines a V-shaped groove, wherein forming the attachment surface comprises applying at least one mirror to a surface of the V-shaped groove, wherein the at least one mirror is configured to focus the heating of the optical fiber within the V-shaped groove.

6. A method according to claim 1 further comprising cleaving the optical fiber to correspond to a shape of the attachment surface.

7. A method according to claim 1 further comprising affixing a glass slab to the optical fiber, wherein the glass slab is configured to extend an area of the optical fiber for engagement with the attachment surface to facilitate formation of the homogenous weld.

8. A method according to claim 1, wherein the PIC defines a groove having a curved cross-section, wherein the attachment surface is a surface of the groove.

9. A method according to claim 1, wherein the attachment surface comprises a passivation layer comprising silicon dioxide.

10. A method according to claim 9 further comprising welding a silicon dioxide chip to the outer portion of the optical fiber, wherein welding the optical fiber onto the attachment surface comprises welding the silicon dioxide chip to the passivation layer.

11. A method according to claim 10 wherein the silicon dioxide chip comprises a silicon nitride waveguide.

12. A method according to claim 9 further comprising affixing an extension to the optical fiber, wherein welding the optical fiber comprises welding the extension to the attachment surface.

13. A method according to claim 12, wherein affixing the extension to the optical fiber comprises affixing the extension to an end of the optical fiber, and wherein the extension is a glass slab.

14. A method according to claim 12, wherein the extension is a prism.

15. A method according to claim 14, wherein the prism comprises a lens.

16. A method according to claim 14 further comprising disposing an intermediate material between the optical fiber and the passivation layer.

17. A method according to claim 16, wherein the intermediate material comprises a lens, and wherein the prism is configured to direct an optical signal from the optical fiber into a waveguide of the PIC via the lens.

18. A method according to claim 1 further comprising affixing an optical glass substrate to the optical fiber, wherein welding the optical fiber comprises welding the optical glass substrate to the attachment surface, wherein the optical glass substrate defines an angled end configured to be welded to the attachment surface such that a predetermined working distance and angle for coupling is achieved.

19. A method for attaching an optical fiber to a photonic integrated circuit (PIC), the method comprising:

providing the PIC;

defining a groove in the PIC wherein the groove comprises an attachment surface configured to receive the optical fiber, wherein the attachment surface of the PIC comprises substantially the same material as an outer portion of the optical fiber;

disposing a passivation layer of silicon dioxide on the attachment surface;

disposing at least a portion of the outer portion of the optical fiber for receipt by the attachment surface; and heating an outer surface of the portion of the outer portion of the optical fiber and the attachment surface of the PIC to a melting point of the material to form a homogenous weld securing the optical fiber with respect to the attachment surface of the PIC.

20. A method according to claim 19 wherein the groove is a V-shaped groove or has a curved cross section.

* * * * *